United States Patent
Haryani et al.

(10) Patent No.: US 10,381,921 B1
(45) Date of Patent: Aug. 13, 2019

(54) SOFT-SWITCHING TRIANGULAR CURRENT MODE CONTROL FOR THREE PHASE TWO-LEVEL CONVERTERS WITH POWER FACTOR CONTROL

(71) Applicant: Virginia Tech Intellectual Properties, Inc., Blacksburg, VA (US)

(72) Inventors: Nidhi Haryani, Blacksburg, VA (US); Rolando Burgos, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 16/053,378

(22) Filed: Aug. 2, 2018

(51) Int. Cl.
*H02M 1/42* (2007.01)
*H02M 7/797* (2006.01)
*H02J 5/00* (2016.01)
*H02M 1/00* (2006.01)

(52) U.S. Cl.
CPC ............. *H02M 1/4216* (2013.01); *H02J 5/00* (2013.01); *H02M 7/797* (2013.01); *H02M 2001/0058* (2013.01)

(58) Field of Classification Search
CPC ............... H02M 1/4216; H02M 7/797; H02M 2001/0058
See application file for complete search history.

(56) References Cited

U.S. PATENT DOCUMENTS 7,495,938 B2 * 2/2009 Wu .................. H02M 7/487
363/172

OTHER PUBLICATIONS

K. Yao; et al. "A Novel Constant Frequency Quasi-CRM Control Scheme of Three phase Single-switch Boost PFC Converter," IEEE Transactions on Power Electronics, vol. 38, No. 8, pp. 6236-6244, Aug. 2017.
M. Leibl et al. "New Boundary Mode Sinusoidal Input Current Control of the Vienna Rectifier," in IEEE 2015 Energy Conversion Congress and Exposition, 2015, pp. 201-209.
Application note—"How to Drive GaN Enhancement Mode Power Switching Transistors", GaN Systems inc., Apr. 26, 2016.
C. Marxgut et al., "Ultraflat Interleaved Triangular Current Mode (TCM) Single-Phase PFC Rectifier," IEEE Transactions on Power Electronics, vol. 29, No. 2, pp. 873-882, Feb. 2014.
K. Cai, and Z. Xu, "A novel control method of three-phase single-switch Boost power factor corrector under variable switching frequency," in Proceedings of International Conference on Power System Technology, 2002(1), pp. 565-569.
Zhengyang Liu et al. "Design of GaN-Based MHz Totem-Pole PFC Rectifier" IEEE Journal of emerging and selected topics in Power Electronics, vol. 4, No. 3, Sep. 2016.

* cited by examiner

*Primary Examiner* — Jue Zhang
*Assistant Examiner* — Afework S Demisse
(74) *Attorney, Agent, or Firm* — Thomas | Horstemeyer, LLP; John S. Sears; Jason M. Perilla

(57) ABSTRACT

Critical-mode soft-switching techniques for a power converter are described. In one example, a power converter includes a bidirectional converter electrically coupled between an alternating current (AC) power system and a direct current (DC) power system, where the bidirectional converter includes a number of phase legs. The power converter can also include a control system configured, during a portion of a line cycle of the AC power system, to clamp a first phase leg of the converter from switching and operate second and third phase legs of the converter independently in either critical conduction mode (CRM) or in discontinuous conduction mode (DCM).

20 Claims, 8 Drawing Sheets

SOFT-SWITCHING TRIANGULAR CURRENT MODE CONTROL FOR THREE PHASE TWO-LEVEL CONVERTERS WITH POWER FACTOR CONTROL

BACKGROUND

Recent advancements in semiconductor technology and the commercial availability of devices with low on-resistance and parasitic capacitance (e.g., SiC & GaN devices) has led to power converters that can achieve high efficiency. This high efficiency is attainable for power converters running at low switching frequencies (e.g., <70 kHz). These power converters can operate in hard switching continuous conduction mode (CCM). Turn-on losses can become dominant for high switching frequency operation when operating in CCM. The trend for increasing switching frequency is driven by the fact that the use of high switching frequencies can lead to a significant reduction in filter sizes. However, high switching frequency operation can sometimes require zero voltage switching (ZVS) turn-on.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
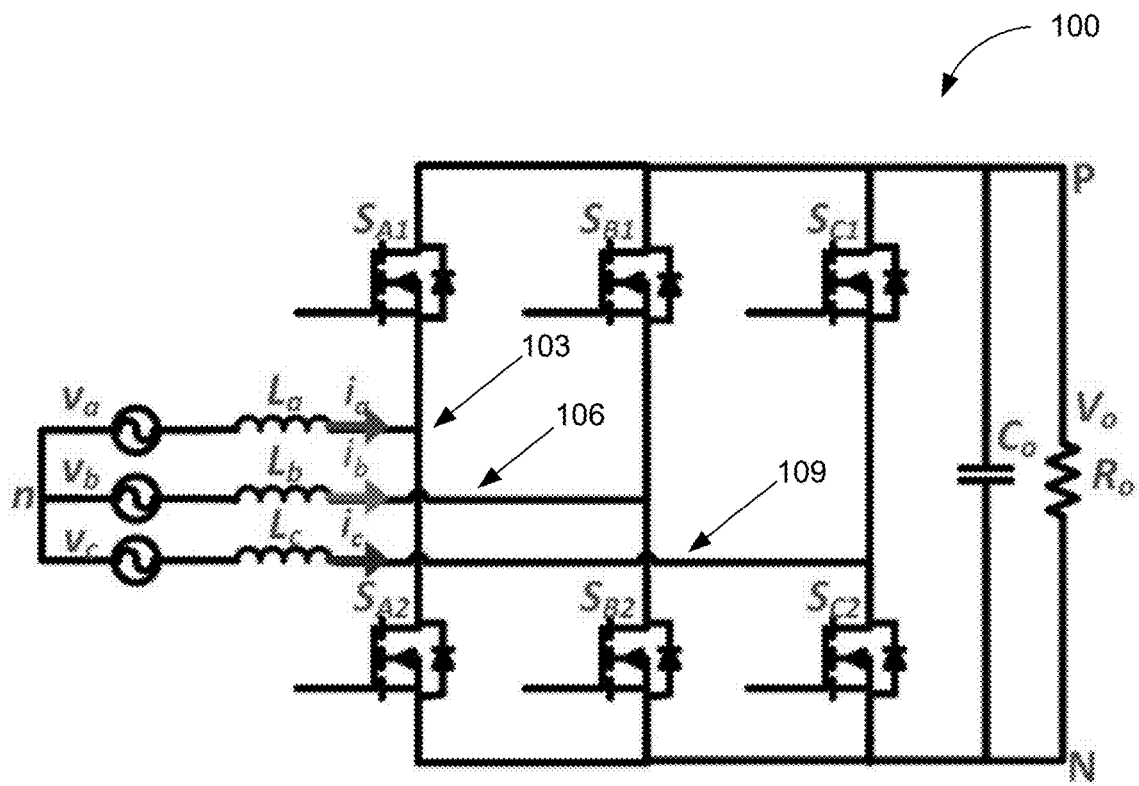
FIG. 1 illustrates an example power converter structure according to various examples described herein.

The examples described herein apply zero voltage switching (ZVS) turn-on triangular current mode (TCM) control for power converters with power factor control. A control scheme for power converters including TCM, discontinuous conduction mode (DCM), and clamped mode operation is discussed. The control scheme is applicable to a wide variety of practical applications, including where a power factor phase shift is desired or if it is introduced by an electromagnetic interference (EMI) filter or other factors. The control scheme can also be applied to various designs of power converters. Thus, although the scheme is described in connection with three-phase two-level power converters, it can be applied to other types and topologies of converters.

Critical conduction mode (CRM) or TCM with ZVS turn-on has relatively high efficiency for single phase boost power factor correction (PFC) at high switching frequencies (e.g., >1 MHz). Thus TCM can be relied upon to have higher efficiency for three phase converters also. TCM with reactive power control can also be useful for practical applications, such as grid tied inverters, where there the load can result in reactive power demand. A phase shift can also be introduced between the input voltage and the inductor current by the EMI filter of the power converter.

In the context presented above, the embodiments described herein are applicable to power converters operating over a range of power generation cases, including a range of power factors, from −1 to 1, i.e., active power, active+reactive power, and purely reactive power. The control scheme is presented in detail along with a discussion of ZVS turn-on operation.

TCM control is an effective way to achieve soft switching with phase synchronization without adding physical complexity to the system. According to the concepts described herein, such control can be implemented to achieve soft switching ZVS turn-on control for three-phase two-level converters with power factor control.

The switching frequency of three-phase boost type rectifier systems in CCM can be limited by the switching loss of devices. Turn-on losses are a major contribution to switching losses of wide bandgap devices (e.g., SiC and GaN devices). Although a transistor can be turned on at zero current as part of DCM control, zero voltage turn-on is generally not possible in DCM. Also, in DCM, if the duty cycle is constant in a line cycle, then the average value of the inductor current in the line cycle is not sinusoidal. Varying the switching frequency so that a power converter operates at the boundary of CCM and DCM, also referred to as TCM, boundary conduction mode (BCM), or critical conduction mode (CRM), can lead to lower input current harmonic distortion. ZVS turn-on can be achieved by allowing inductor current to flow in both directions during one switching cycle, such that the body diode of a respective switch starts conducting before the switch is turned on.

As described herein, a sinusoidal average current which is not directly proportional to the respective phase voltage can be achieved while maintaining ZVS turn-on. The detailed basic operation of TCM for the case of unity power factor is also discussed. The cases of active+reactive power and purely reactive power are also described. A control scheme is described including TCM, DCM, and clamped mode operation of a three-phase, six-switch, two-level power converter as an example, although the control scheme can be applied to other topologies of power converters. For 30° lagging, the phase with maximum switching current can be clamped. For 90° lagging, one phase can be clamped+TCM+DCM.

For three-phase converters, soft switched turn-on can be achieved with TCM for a range of power factors. This extends the capability of ZVS turn-on operation to a wide range of applications like grid tied inverters, uninterruptable power supplies, battery chargers, etc. A general solution can be applied for the range of power factors from −30° to 30° for both rectifier and inverter mode, i.e., ⅓rd of the power factor range.

Referring to FIG. 1, an example power converter 100 is illustrated according to various examples described herein. The power converter 100 is a three-phase, six-switch, two-level power converter operating in rectifier mode. The input voltage to the power converter 100 is a three-phase alternating current (AC) source, and can be given by:

$$v_a = V_m \sin(\omega t), \ v_b = V_m \sin(\omega t - 2\pi/3), \ v_c = V_m \sin(\omega t + 2\pi/3). \quad (1)$$

The power converter 100 includes three phase legs 103, 106, and 109. As shown, the phase leg 103 is associated with the input voltage $v_a$ and includes the inductor $L_a$, the switch $S_{A1}$, and the switch $S_{A2}$. The phase leg 106 is associated with the input voltage $v_b$ and includes the inductor $L_b$, the switch $S_{B1}$, and the switch $S_{B2}$. The phase leg 109 is associated with the input voltage $v_c$ and includes the inductor $L_c$, the switch $S_{C1}$, and the switch $S_{C2}$. As can be appreciated, a switch can have a drain-source voltage, such that $V_{dsC2}$ refers to the drain-source voltage of switch $S_{C2}$, for example. Further, the inductor currents $i_a$, $i_b$, and $i_c$ are the currents through the inductors $L_a$, $L_b$, and $L_c$, respectively. The switches $S_{A1}$, $S_{A2}$, $S_{B1}$, $S_{B2}$, $S_{C1}$, and $S_{C2}$ can be embodied as any semiconductor switches suitable for use in the power converter 100, including synchronous rectifiers with relatively low on-resistances and parasitic capacitances (e.g., SiC & GaN devices), among others.

Figure 2:
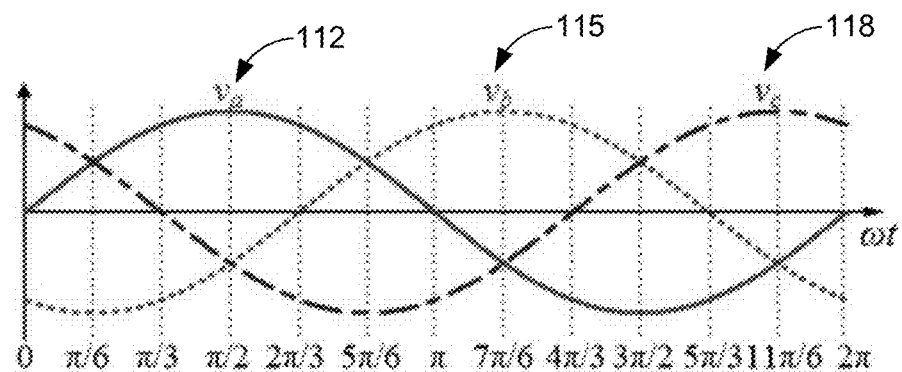
FIG. 2 illustrates an example of input voltages for one line cycle during operation of the power converter structure shown in FIG. 1 according to various examples described herein.

FIG. 2 illustrates an example of input voltages for one line cycle during operation of the power converter 100 shown in FIG. 1. As shown, the input voltages $v_a$ 112, $v_b$ 115, and $v_c$ 118 for one line cycle can be divided into 12 sectors. In each sector, a voltage direction and relative size of the input voltages $v_a$ 112, $v_b$ 115, and $v_c$ 118 can be the same.

Figure 3:
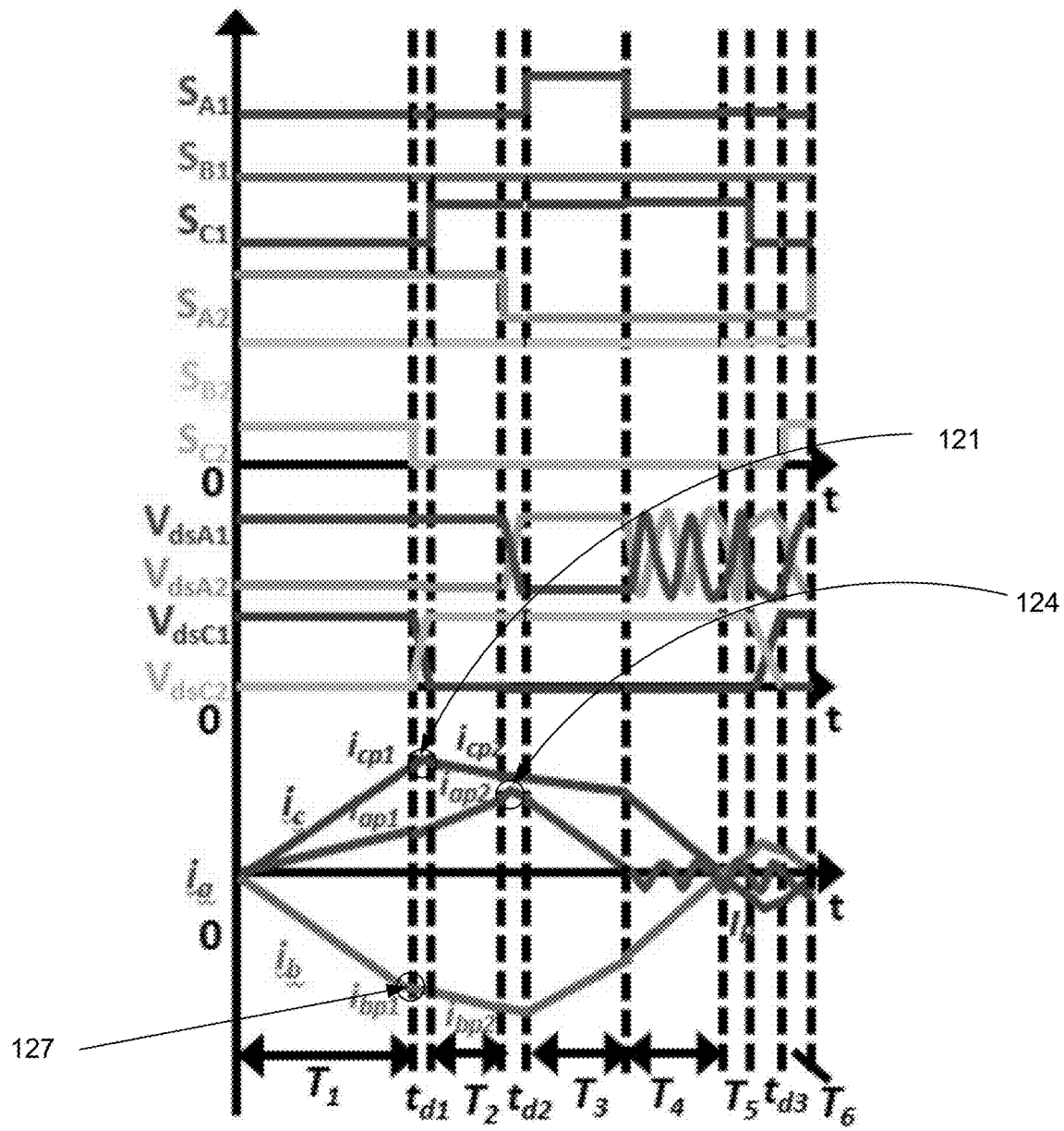
FIG. 3 illustrates an example of gate signals, drain-source voltages, and inductor currents in a power converter using triangular current mode (TCM)-based soft-switching techniques for zero voltage switching (ZVS) turn-on control at unity power factor (u.p.f.) according to various examples described herein.

FIG. 3 illustrates an example of gate signals, drain-source voltages, and inductor currents in the power converter 100 when using TCM-based soft-switching techniques for ZVS turn-on control at u.p.f. according to various examples described herein. Particularly, for one sector (e.g., 0<ωt<π/6) of the line cycle shown in FIG. 2, the gate signals $S_{A1}$, $S_{B1}$, $S_{C1}$, $S_{A2}$, $S_{B2}$, and $S_{C2}$ of the switches $S_{A1}$, $S_{A2}$, $S_{B1}$, $S_{B2}$, $S_{C1}$, and $S_{C2}$, respectively, are shown in FIG. 3. Further, the drain-source voltages $V_{dsA1}$, $V_{dsA2}$, $V_{dsC1}$, and $V_{dsC2}$ across the switches $S_{A1}$, $S_{A2}$, $S_{C1}$, and $S_{C2}$, respectively, are shown. The inductor currents $i_a$, $i_b$, and $i_c$, through the inductors $L_a$, $L_b$, and $L_c$, respectively, are also shown.

Where the switching frequency of the power converter 100 is much higher than the line frequency of the input voltages, the input voltages can be assumed to be constant for one switching period. At the end of $T_1$, when $i_c$ reaches its peak value $i_{cp1}$ at 121, the switch $S_{C2}$ can be turned off and the switch $S_{C1}$ can be turned on. At the same time, as shown at 127, $i_b$ can reach a peak value $i_{bp1}$. The lengths of $T_1$ & $T_2$ can be set by average current controller to achieve sinusoidal currents for the three phases. The average current controllers shapes the peak currents to achieve sine currents. $T_1$ can also be called as on time of device $S_{C2}$.

After the switch $S_{C2}$ is turned off, resonance can occur between $L_c$ in phase 109 and the capacitances in the devices $S_{C1}$ and $S_{C2}$ during $t_{d1}$. Thus, during $t_{d1}$, $v_{dsC2}$ rises and $V_{dsC1}$ drops to zero. Further, the body diode of switch $S_{C1}$ starts conducting, and the switch $S_{C1}$ can be turned on at zero voltage as shown in FIG. 3.

After the current is in the phase leg 103 reaches $i_{ap2}$, the switch $S_{A2}$ can be turned off. As shown at region 124, $i_a$ can reach a second peak value $i_{ap2}$. The lengths of $T_1$ & $T_2$ can be set by average current controller to achieve sinusoidal currents for the three phases. The average current controllers shapes the peak currents to achieve sine currents. $T_1+T_2$ can also be called as on time of device $S_{A2}$. Switch $S_{A1}$ can be turned on at zero voltage. Since $v_a$ is the least in magnitude, the current is in the phase leg 103 current reaches zero first, and switches $S_{B2}$ and $S_{C1}$ continue to conduct until the currents reach zero. After $i_c$ reaches zero, it is allowed to decrease to a negative value $I_R$, which discharges the device capacitance across switch $S_{C2}$ for ZVS turn-on of switch $S_{C2}$. As depicted, as phase A is left open during $T_4$, resonance occurs between $L_a$ and parasitic capacitors of $S_{A1}$ & $S_{A2}$.

As inductor current slopes vary during the line frequency, the switching frequency also varies. This variation can be input voltage and load dependent. Also, it is clear from FIG. 3 that $T_3$ is dependent on $T_1$ and $T_2$, while $T_4$ is dependent on $T_1$, $T_2$, and $T_3$. $T_3$ is the time $i_a$ takes to reach zero which is dependent on $i_{ap1}$, hence indirectly dependent on $T_1$ & $T_2$. At the end of $T_4$, $i_c$ & $i_b$ reach zero, then $i_c$ is allowed to go a little negative before $S_{C2}$ is turned on again at zero voltage. Average currents can be controlled by the two variables $T_1$ and $T_2$, which can control three average currents simultaneously. As depicted in FIG. 3, $t_{d1}$, $t_{d2}$, and $t_{d3}$ can also be referred to as dead time.

For a balanced three phase system:

$$i_a + i_b + i_c = 0. \quad (2)$$

Two control parameters $T_1$ and $T_2$ can be used to generate average sinusoidal currents. The average current for each switching cycle will be the average of the triangular ripple over one switching cycle, the ripple in turn depends on $T_1$ & $T_2$, hence a choice of $T_1$ & $T_2$ can generate sine currents. $T_5$, also referred to as reverse conduction time, can be calculated from the minimum reverse current $I_R$ required for ZVS turn-on. $T_6$, also referred to as reverse recovery time, can be derived from $T_5$. As $T_6$ can be calculated from $I_R$ because the slope of inductor current is dependent on voltage across it. $T_5$ depends on $I_R$ too, hence $T_6$ can be derived from $I_R$ or $T_5$. Since the duty times depend on input voltage, this modulation can also result in a variable switching frequency from about 1-1.34 MHz, for example.

Figure 4A:
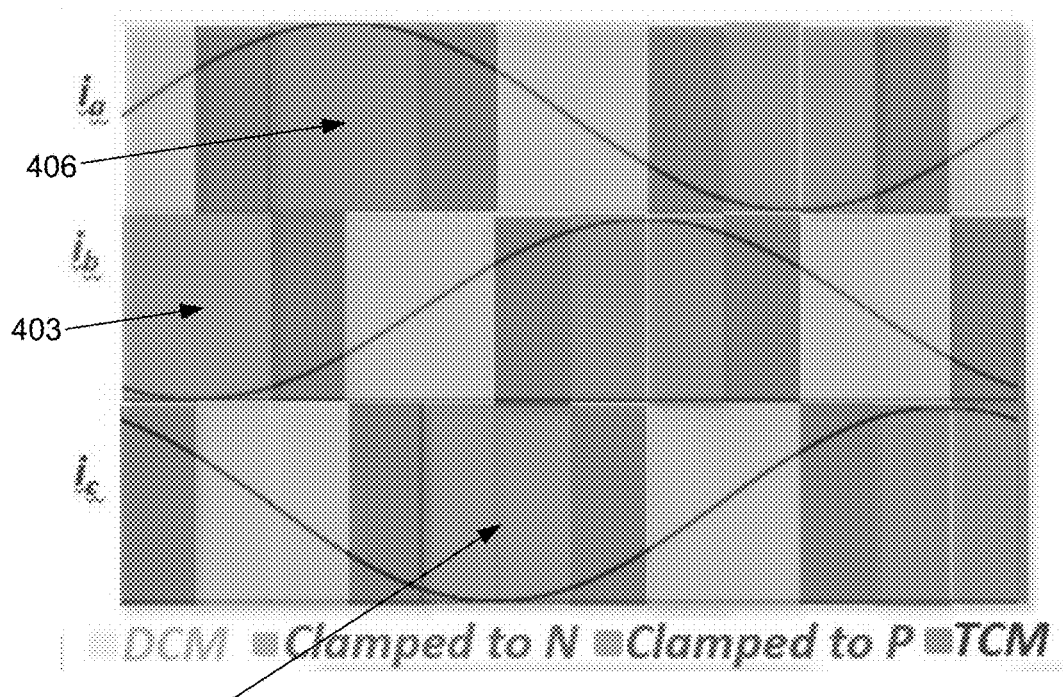
FIG. 4A illustrates an example of TCM full line cycle control using discontinuous conduction mode (DCM), TCM, and clamped mode operation for u.p.f. according to various examples described herein.

Referring now to FIG. 4A, shown is an example of TCM full line cycle control using DCM, TCM, and clamped mode operation for u.p.f. A phase with a maximum average and switching current (e.g., the phase leg 106 in Sector I as depicted in FIG. 4A) can be clamped, since 115 is negative in sector I, 106 is clamped to the negative DC bus. As shown at 403, the phase leg 106 can be clamped to the negative DC bus (e.g., switch $S_{B2}$ closed and switch $S_{B1}$ open) in the power converter 100, as denoted by the "Clamped to N" in FIG. 4A. Phase leg 106 can be clamped to the negative DC bus for a 0~60 degree time interval as the average current and voltage for phase leg 106 is maximum for this interval, the other two phases are operating in TCM or DCM. For example, the phase leg 103 can be operated in DCM during a 0~30 degree interval as the average current and voltage magnitude for phase leg 103 is minimum during this interval while the phase leg 109 can be operated in TCM as during this interval $|v_c|>|v_a|$. During the 30~60 degree interval, the phase leg 103 can be operated in TCM while the phase leg 109 can be operated in DCM as during this interval $|v_a|>|v_c|$. The phase leg with maximum absolute value of average current is clamped, the phase leg with minimum absolute value of average current operates in DCM and the phase leg with the average current value between the two is operated in TCM as shown in FIG. 4A.

Continuing the process, during the 60~120 degree interval, the phase leg 103 can be clamped. As shown at 406, the phase leg 103 can be clamped to the positive DC bus as the reference current is maximum and greater than 0 (e.g., switch $S_{A1}$ closed and switch $S_{A2}$ open), as denoted by "Clamped to P" in FIG. 4A. The other two phases can be operating TCM or DCM. For example, the phase leg 109 can be operated in DCM during a 60~90 degree interval while the phase leg 106 can be operated in TCM. During the 90~120 degree interval, the phase leg 109 can be operated in TCM while the phase leg 106 is operated in DCM. Accordingly, for the remaining intervals, any phase that reaches a maximum average and switching current in magnitude can be clamped in each 60-degree time interval of the line cycle. The other two phases can be operated independently in either DCM or TCM. The phase with minimum absolute average or switching current operates in DCM while the third one operates in TCM. As shown at 409 for example, the phase leg 109 can be clamped to the negative DC bus in the power converter 100 while the phase leg 103 and the phase leg 106 can be operated in either TCM or DCM.

Figure 4B:
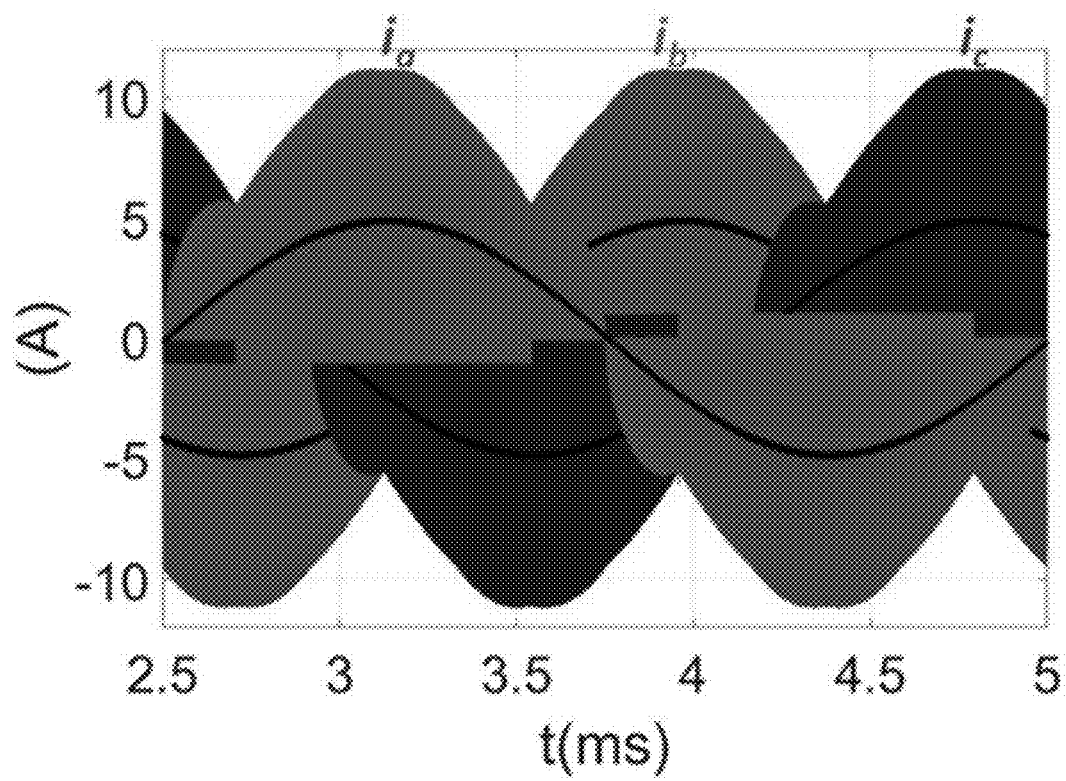
FIG. 4B illustrates a simulated inductor current according to various examples described herein.

FIG. 4B depicts the simulated currents with proposed control. Previously, TCM has only been discussed for single phase/three phase rectifier systems working in PFC mode (u.p.f.), as it can be easier to achieve currents directly proportional to voltages by shorting all the three phases simultaneously (i.e., $S_{A2},S_{B2},S_{C2}$ or $S_{A1},S_{B1},S_{C1}$ conduct together). FIG. 4B illustrates simulated inductor currents $i_a$, $i_b$, and $i_c$, for 1.2 kW power delivered by converter, 115 $V_{acrms}$, 400 Hz line frequency of AC voltage, 400 V-$V_{dc}$ DC bus voltage, TCM ($f_s$ 1-1.34 MHz) switching frequency variation, and L~4 µH inductance value for $L_a$, $L_b$, $L_c$.

Figure 4C:
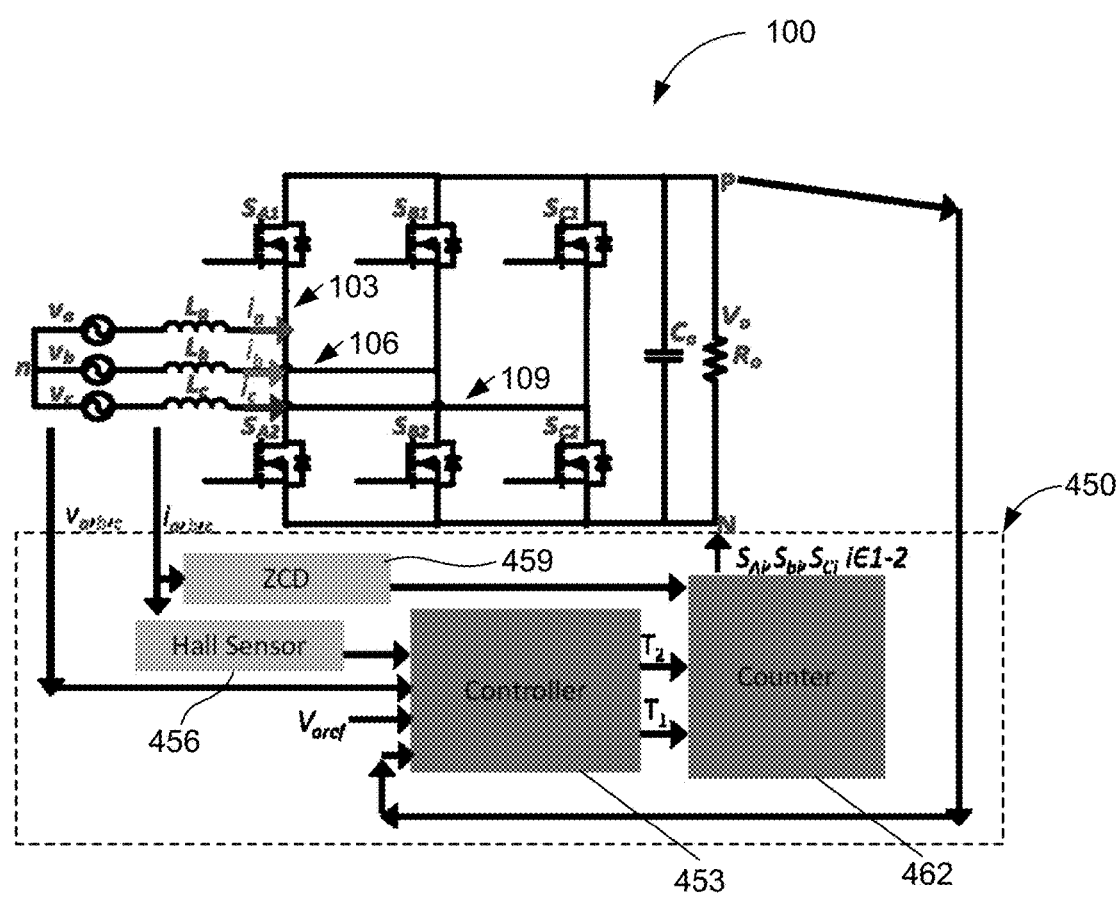
FIG. 4C illustrates an example control system for control using DCM, TCM, and clamped mode operation according to various examples described herein.

FIG. 4C depicts a control system 450 for control of the power converter 100 (FIG. 1) using DCM, TCM, and clamped mode operation according to various examples described herein. The control system 450 includes a controller 453, three Hall sensors 456, three zero crossing detectors (ZCD) 459, and a counter 462. The controller 453 receives a number of inputs, including values of $v_a$, $v_b$, and $v_c$. The Hall sensors depicted as Hall sensor 456 sense the low frequency average inductor currents $i_a$, $i_b$, and $i_c$ in the phase leg 103, the phase leg 106, and the phase leg 109, respectively, and provides the average inductor currents $i_a$, $i_b$, and $i_c$ to the controller 453. The ZCD 459 detects when $i_a$, $i_b$, or $i_c$ crosses zero. The controller 453 as depicted includes a control loop from the positive DC bus (denoted as P) and a control loop from the negative DC bus (denoted as N). The controller 453 can measure the output voltage $V_o$ and control to track the reference voltage $V_{oref}$. Based on which phase is operating in DCM/TCM/Clamped mode (depending on the magnitude of each phase voltage), the controller decides which phase's ZCD signal is to be used for the beginning of every switching cycle.

The controller 453 generates the values of $T_1$ and $T_2$ that can be used to generate average sinusoidal currents. The controller 453 also calculates a minimum reverse current required for ZVS turn-on of a first switch in the power converter 100. The counter 462 as depicted keeps track of each instant in the switching cycle by using an integrator, and controls all the switches of the power converter 100. Using the control system 450, it is possible to control the power converter 100 (FIG. 1) using DCM, TCM, and clamped mode operation at a unity power factor condition and at a non-unity power factor condition.

For example, the controller can decide which phase operates in DCM, TCM or clamped mode as shown in FIG. 4A, further it can generate the gating signals shown in FIG. 3 for example to finally generate inductor currents shown in FIG. 4B. The controller 453 determines the values of $T_1$ and $T_2$ as depicted in FIG. 3. Operation of the controller 453 can, for example, include deciding which phase is to be clamped. During a 60-degree time interval, the controller 453 can clamp a phase leg of the power converter 100 (FIG. 1) to prevent one of the phase legs (103, 106 or 109) from switching. In some examples, the controller 453 can clamp the leg of the power converter 100 with the maximum average and switching current (e.g., phase leg 106 in Sector I as depicted in FIG. 4A). The controller 453 can also clamp a phase leg of the power converter 100 to the negative bus of the DC power system or the positive bus of the DC power system depending on the sign of reference average current.

Operation of the controller 453 can also include operating during a first cycle in the portion of the line cycle and a second cycle in the portion of the line cycle. As shown in FIG. 4A at 403, the converter 453 can clamp the phase leg 106 of the power converter 100 (FIG. 1) to the negative DC bus while the controller 453 operates each of a second phase leg of the power converter 100 and a third phase leg of the power converter 100 independently in either discontinuous conduction mode (DCM) or triangular current mode (TCM). During a first cycle, 0~30 degree interval, for example the controller 453 can operate phase leg 103 of the power converter 100 in DCM while the controller 453 operates phase leg 109 of the power converter 100 in TCM. During a second cycle, 30~60 degree interval, the controller 453 can operate phase leg 103 of the power converter 100 in TCM while the controller operates phase leg 109 of the power converter 100 in DCM. The controller 453 can additionally operate as shown at in FIG. 4A at 406 and 409. The controller 453 can for example clamp a first phase leg, phase leg 103 of the power converter 100, to the positive DC bus while the controller 453 operates each of the other two phases, phase leg 106 and phase leg 109 of the power converter 100, in TCM or DCM.

The controller 453 can also allow an inductor current to flow in both directions during the portion of the line cycle, such that a body diode of a switch of the power converter 100 (FIG. 1) starts conducting before the switch is turned on, and thus achieve ZVS turn on of the switch. For example, when $i_c$ reaches zero, the controller 453 can turn off a switch of the power converter 100 in a third phase leg of the power converter 100 to allow resonance to occur between two device capacitors on the third phase leg of the power converter 100 and at least one inductor on the third phase leg of the power converter 100 during a second time period. At the end of this resonance period, body diode of $S_{C2}$ in 109 will start conducting and the controller 453 can turn on a second switch in the third phase leg of the power converter 100 at zero voltage. The controller 453 can for example control the switch in the third phase leg of the power converter 100 after a current on the third phase leg of the power converter 100 reaches a peak value. The controller 453 can also control the switch in the third phase leg of the power converter 100 such that a current on the third phase leg of the power converter 100 reaches a desired peak value. For example, the controller 453 controls the switch such that the current reaches the desired peak value, then the controller 453 turns the switch off and turns on the auxiliary device in phase leg 109 at 0V after resonance.

In another example, at the end of one switching interval, the controller 453 can turn off a switch in the third phase leg of the power converter 100 allowing, during a second switching interval, a current on the first phase leg of the power converter 100 to reach its peak value $i_{ap2}$, a switch in the first leg of the power converter 100 and a second switch in the third leg of the power converter 100 to conduct, and a current on the first phase leg of the power converter 100 to reach zero during a third switching interval. At an end of the second time interval, the controller 453 can turn on a second switch in the first phase leg of the power converter 100 at zero voltage allowing the current on the third phase leg of the power converter 100 to discharge a capacitor across the switch in the third leg of the power converter 100 and permit zero voltage turn on of the switch in the third leg of the power converter 100.

Operation of the controller 453 can generate average sinusoidal currents at a unity power factor. In another example, the controller 453 can operate to achieve a sinusoidal average current that can be expressed as a sum of two phasors as described below with reference to the remaining figures. Operation of the controller 453 can thus generate average sinusoidal currents at a unity power factor and at a non-unity power factor.

Figure 5A:
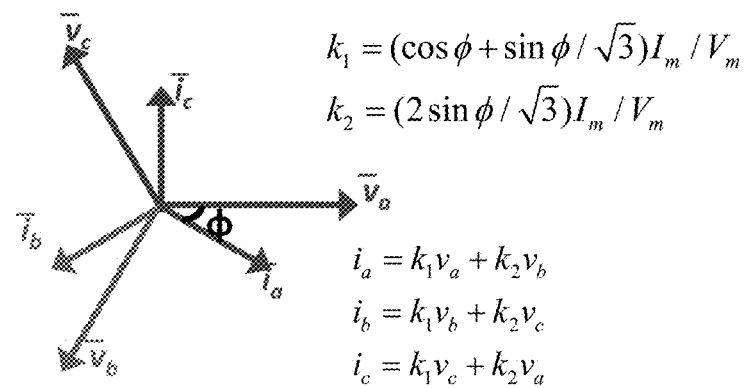
FIG. 5A illustrates a phasor diagram of an average current for an active+reactive power case according to various examples described herein.

Referring now to FIG. 5A, shown is a phasor diagram of an average current for an active+reactive power case. In the case of reactive power, average currents will not be proportional to phase voltages. Current $i_b$ can be expressed as $i_b=k_1v_b+k_2v_c$. $i_a$ can be expressed as $i_a=k_1v_a+k_2v_b$. $i_c$ can be expressed as $i_c=k_1v_c+k_2v_a$. Average current can be expressed as a sum of two phasors as shown in FIG. 5A.

Figure 5B:
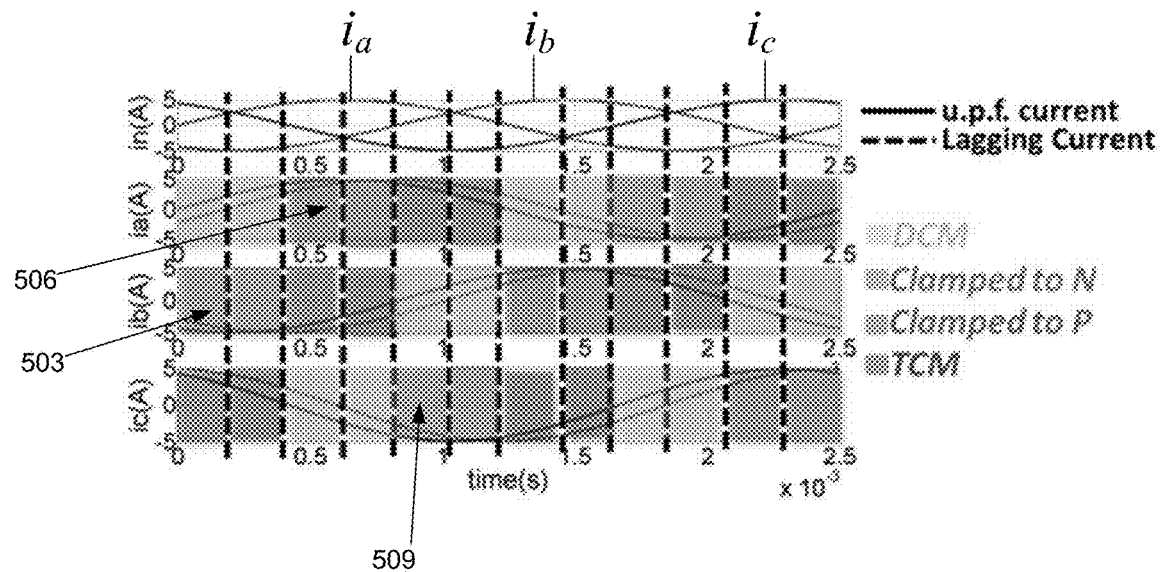
FIG. 5B illustrates an example of TCM full line cycle control for 30° lagging currents using DCM, TCM, and clamped mode operation according to various examples described herein.
Figure 6A:
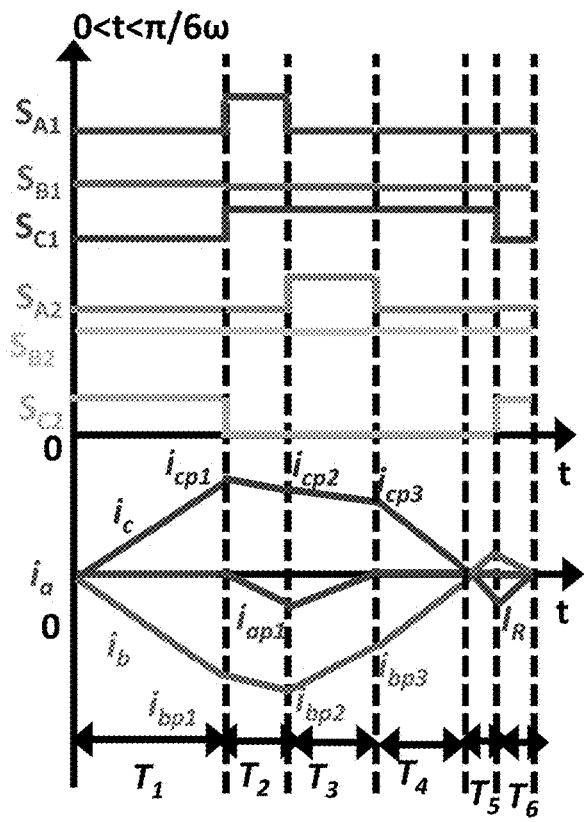
FIG. 6A illustrates gate signals and inductor currents in a power converter in one sector using TCM soft-switching techniques for ZVS turn-on control for power factor of 30° lagging according to various examples described herein.

Moving on to FIG. 5B, an example of TCM full line cycle control using DCM, TCM, and clamped mode operation for 30° lagging power factor is shown. A reference average current for 30° lagging case is depicted as denoted by "Lagging Current" in FIG. 5B. The 30° lagging power factor refers to lagging the reference average current. The line cycle can be divided into twelve sectors as shown. Up to 30° phase lag, the phase leg 103 average current is the smallest in magnitude in sector I, hence it is in DCM but since the average $i_a$ is negative, the ripple in phase leg 103 is negative as shown in FIG. 6A. FIG. 6A shows gate signals and inductor currents in one sector using triangular-current-mode-based soft-switching techniques for ZVS turn-on control for power factor of 30° lagging. Referring again to FIG. 5B, a phase with the highest average and switching current (phase leg 109 in sector II as depicted in FIG. 5B) can be clamped for half the line cycle. While in the other half cycle, the phase with highest average current cannot be clamped, for example, if phase C is clamped to P in sector I, the body diode of one of the devices in DCM phase (phase A in sector I) becomes forward biased and starts to conduct when all the devices in DCM phase are of, thus resulting in unwanted ripple in DCM phase leading to higher losses. Hence to avoid hence losses, phase with maximum absolute voltage is continued to clamp.

As shown at 503, the controller 453 (FIG. 4C) can clamp phase leg 106 to the negative DC bus (e.g., switch $S_{B2}$ closed and switch $S_{B1}$ open), in the power converter 100, as denoted by the "Clamped to N" in FIG. 5B. The controller 453 can clamp phase leg 106 to N for a 0~60 degree time interval as the controller 453 operates the other two phases in TCM or DCM. The phase with minimum absolute reference average current operates in DCM.

Continuing the process, during the 60~120 degree interval as shown at 506, the controller 453 can clamp phase leg 103 to the positive DC bus (e.g., switch $S_{A1}$ closed and switch $S_{A2}$ open), as denoted by "Clamped to P" in FIG. 5B. The controller 453 can operate the other two phases in TCM or DCM. The phase with minimum absolute reference average current operates in DCM. Accordingly, for the remaining intervals, controller 453 can clamp a phase that reaches a maximum phase voltage in each 60-degree time interval of the line cycle. As shown at 509 for example, the controller 453 can clamp phase leg 109 to the negative DC bus in the power converter 100 while the controller 453 can operate phase leg 103 and phase leg 106 in either TCM or DCM.

As discussed, ZVS turn-on conditions can be achieved for all phases. For example, operation of the control system 450 allows switch $S_{A1}$ to achieve ZVS turn on for $i_a>0$. Switch $S_{A2}$ can achieve ZVS turn on for $i_a<0$. Switch $S_{C1}$ can achieve ZVS turn on for $i_c>0$. Switch $S_{B1}$ can achieve ZVS turn on for $i_b>0$. Switch $S_{B2}$ can achieve ZVS turn on for $i_b<0$. Switch $S_{C1}$ can achieve ZVS turn on for $i_c>0$. Switch $S_{C2}$ can achieve ZVS turn on for $i_c<0$.

Figure 6B:
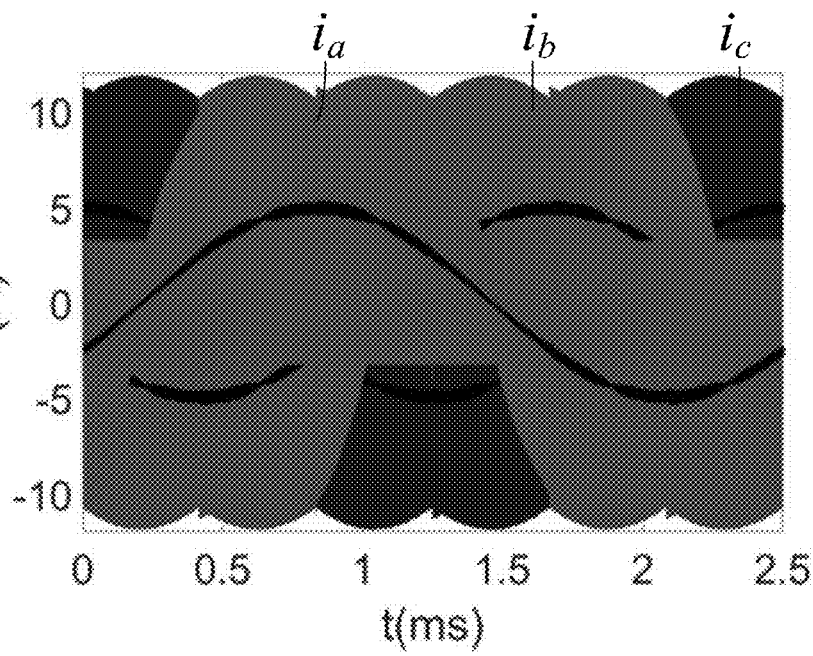
FIG. 6B illustrates a simulated inductor current for 30° lagging current according to various examples described herein.

FIG. 6B illustrates a simulated inductor current for proposed control. FIG. 6B shows inductor current for 1.2 kVA, 115 $V_{acrms}$, 400 V-$V_{dc}$ ($f_s$ –0.7-0.85 MHz), L~4 μH, 30° lagging power factor.

Figure 7:
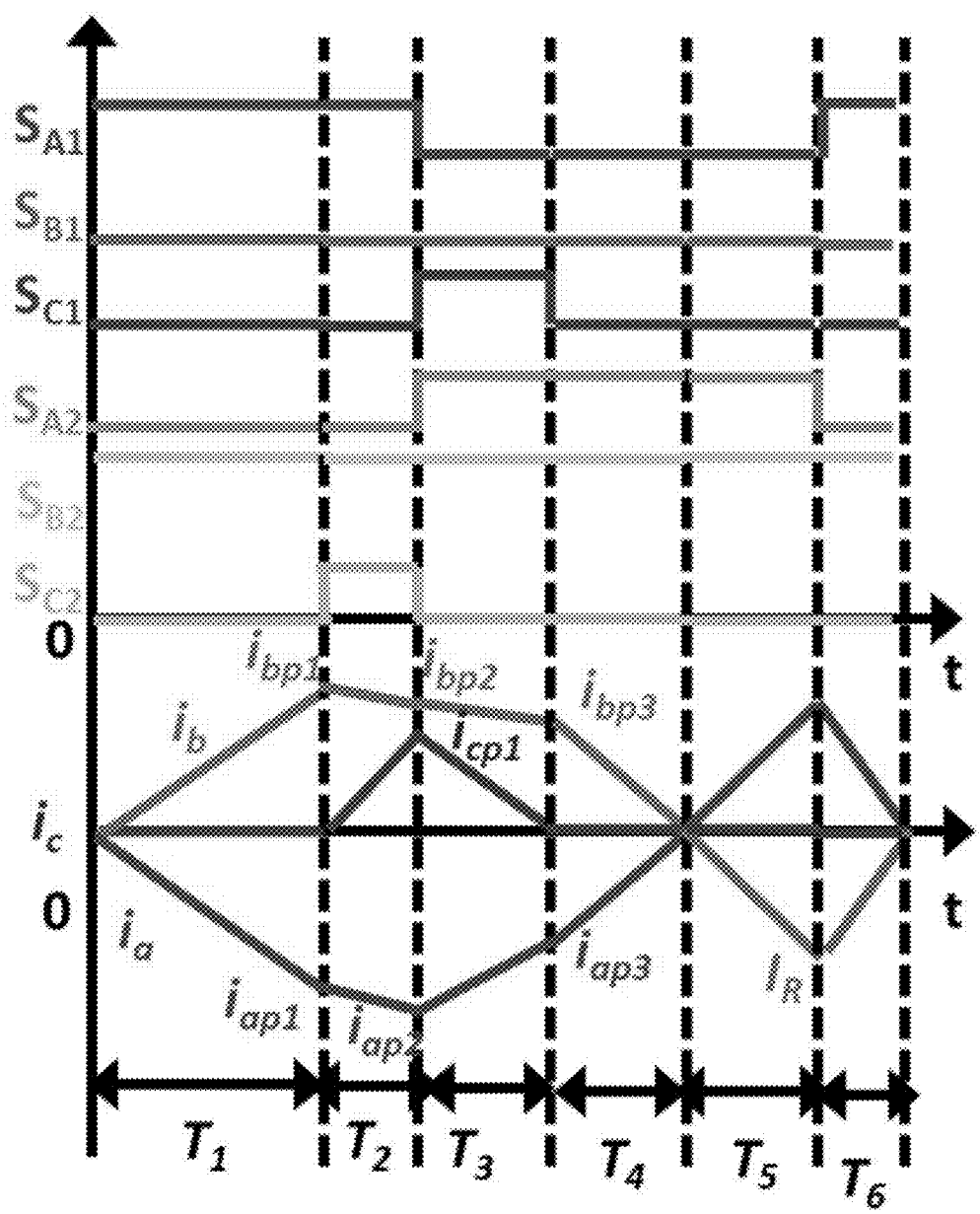
FIG. 7 illustrates gate signals and inductor currents in a power converter for one switching cycle in one sector using TCM soft-switching techniques for ZVS turn-on control for 90° lagging power factor according to various examples described herein.

FIG. 7 illustrates gate signals and inductor currents for one switching cycle in one sector using triangular-current-mode-based soft-switching techniques for ZVS turn-on control for 90° lagging power factor. The current ripple for one switching cycle in sector I is shown.

Figure 8A:
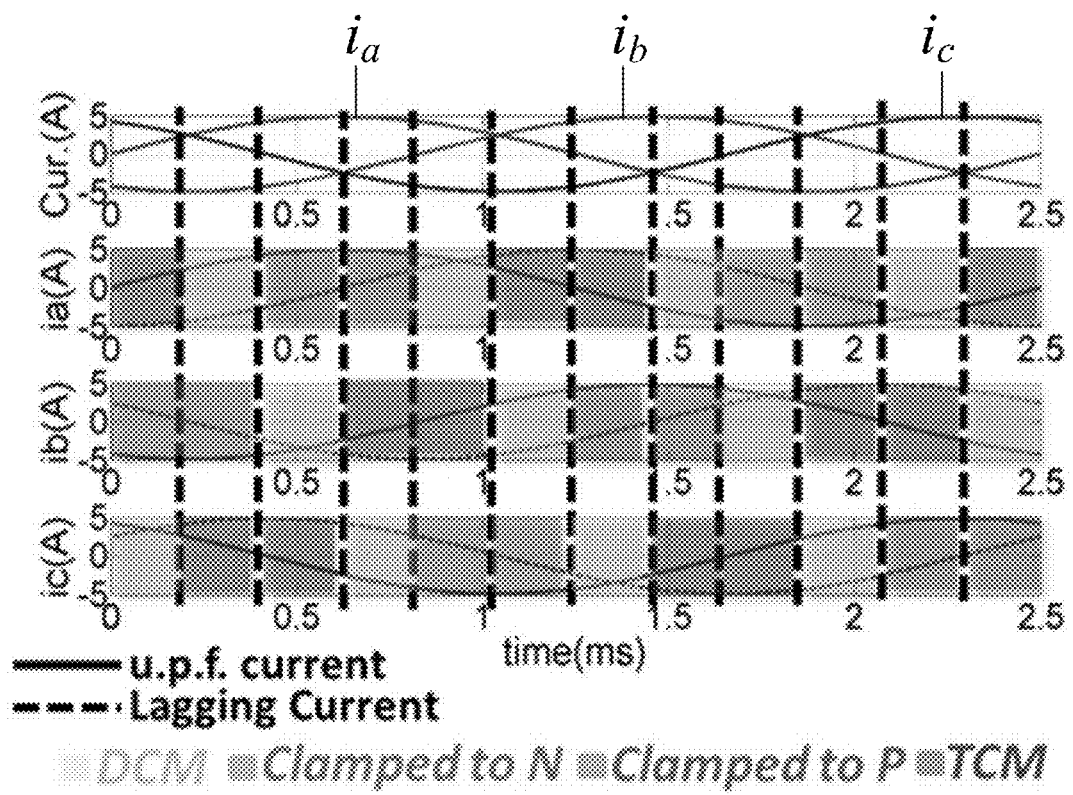
FIG. 8A illustrates an example of TCM full line cycle control using DCM, TCM, and clamped mode operation for power factor of 90° lagging according to various examples described herein.

FIG. 8A illustrates an example of TCM full line cycle control using DCM, TCM, and clamped mode operation for power factor of 90° lagging. A reference average current for 90° lagging case is depicted as denoted by "Lagging Current" in FIG. 8A. The 90° lagging power factor refers to lagging the reference average current. The controller 453 (FIG. 4C) can apply a combination of DCM, TCM, and clamped mode operation as depicted in FIG. 8A. The current ripple for one switching cycle in sector I is shown in FIG. 7. The controller 453 can clamp a phase with a maximum absolute voltage and switching current (phase leg 106 in Sector I as depicted in FIG. 8A). As shown, the controller 453 can clamp phase leg 106 to the negative DC bus (e.g., switch $S_{B2}$ closed and switch $S_{B1}$ open) in the power converter 100, as denoted by the "Clamped to N" in FIG. 8A. The controller 453 can clamp phase leg 106 to N for a 0~60 degree time interval as the controller 453 operates the other two phases in TCM or DCM. For example, the controller 453 can operate phase leg 103 in TCM during a 0~30 degree interval while the controller 453 operates phase leg 109 in DCM. During the 30~60 degree interval, the controller 453 can operate phase leg 103 in DCM while the controller 453 operates phase leg 109 in TCM.

Continuing the process, during the 60~120 degree interval, the controller 453 can clamp phase leg 103 to the positive DC bus (e.g., switch $S_{A1}$ closed and switch $S_{A2}$ open), as denoted by "Clamped to P" in FIG. 8A. The controller 453 can operate the other two phases in TCM or DCM. For example, the controller 453 can operate phase leg 109 in TCM during a 60~90 degree interval while the controller 453 operates phase leg 106 in DCM. During the 90~120 degree interval, the controller 453 can operate phase leg 109 in DCM while the controller 453 operates phase leg 106 in TCM. Accordingly, for the remaining intervals, the controller 453 can clamp a phase that reaches a maximum absolute phase voltage and hence switching current in each 60-degree time interval of the line cycle. The controller 453 can operate the other two phases independently in either DCM or TCM.

Figure 8B:
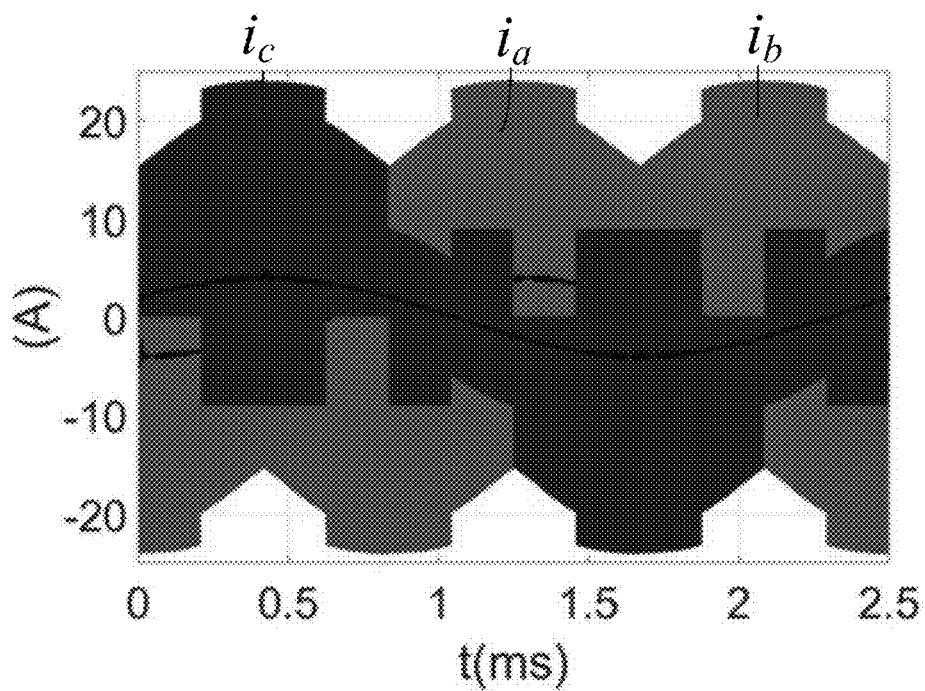
FIG. 8B illustrates a simulated inductor current for 90° lagging power factor according to various examples described herein.

FIG. 8B illustrates a simulated inductor current for DCM, TCM, and clamped mode operation for 90° lagging power factor. The simulated waveform for the line cycle is shown for 1.2 kVA, 115 $V_{acrms}$, 400 $V\text{-}V_{dc}$ ($f_s$ ~0.45-0.54 MHz), L~4 μH for 90° lagging power factor.

In conclusion, soft switched turn-on for three phase converters can be achieved with TCM for the range of power factors. This extends the capability of ZVS turn-on operation (including in some examples by not adding any additional components to the converter) to a wide range of applications like grid tied inverters, ups, battery chargers etc. A general solution can be applied for the range of power factors from −30° to 30° for both rectifier and inverter mode, e.g., $\frac{1}{3}^{rd}$ of the power factor range.

The components described herein, including the control system 450, controller 453, Hall sensor 456, zero crossing detector (ZCD) 459, and counter 462 can be embodied in the form of hardware, firmware, software executable by hardware, or as any combination thereof. If embodied as hardware, the components described herein can be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs)), or complex programmable logic devices (CPLDs)), among other types of processing circuitry.

The microprocessors, microcontrollers, or DSPs, for example, can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A power converter, comprising:
   a bidirectional converter electrically coupled between an alternating current (AC) power system and a direct current (DC) power system, the bidirectional converter comprising a number of phase legs; and
   a control system for the bidirectional converter configured, during a portion of a line cycle of the AC power system, to:
   clamp a first phase leg of the bidirectional converter from switching; and
   operate each of a second phase leg of the bidirectional converter and a third phase leg of the bidirectional converter independently in either discontinuous conduction mode (DCM) or triangular current mode (TCM).

2. The power converter of claim 1, wherein the control system is further configured, during a first cycle in the portion of the line cycle, to:
   operate the second phase leg of the bidirectional converter in DCM; and
   operate the third phase leg of the bidirectional converter in TCM.

3. The power converter of claim 2, wherein the control system is further configured, during a second cycle in the portion of the line cycle, to:
   operate the second phase leg of the bidirectional converter in TCM; and
   operate the third phase leg of the bidirectional converter in DCM.

4. The power converter of claim 3, wherein:
   the portion of the line cycle comprises about a 60-degree time interval; and
   at a unity power factor condition, the first cycle in the portion of the line cycle comprises about a first 30-degree time interval, and the second cycle in the portion of the line cycle comprises about a second 30-degree time interval.

5. The power converter of claim 3, wherein:
   the portion of the line cycle comprises about a 60-degree time interval; and
   at a non-unity power factor condition, the first cycle in the portion of the line cycle comprises about a first 30-degree time interval, and the second cycle in the portion of the line cycle comprises about a second 30-degree time interval.

6. The power converter of claim 1, wherein the control system is further configured to clamp the first phase leg of the bidirectional converter to one of a negative bus of the DC power system or a positive bus of the DC power system.

7. The power converter of claim 1, wherein the first phase leg of the bidirectional converter is a phase leg that has a maximum average and switching current.

8. The power converter of claim 1, wherein:
   the portion of the line cycle comprises about a 60-degree time interval; and
   the control system is further configured, at a non-unity power factor condition, to:
   operate the second phase leg of the bidirectional converter in DCM; and
   operate the third phase leg of the bidirectional converter in TCM.

9. The power converter of claim 1, wherein the control system is configured to operate each of a second phase leg of the bidirectional converter and a third phase leg of the bidirectional converter independently at a non-unity power factor; and wherein the control system is further configured to operate each of the first phase leg, the second phase leg, and the third phase leg at a same switching frequency.

10. The power converter of claim 9, wherein the control system operates to achieve a sinusoidal average current that can be expressed as a sum of two phasors.

11. The power converter of claim 1, wherein the control system is configured to allow an inductor current to flow in both directions during the portion of the line cycle, such that a body diode of a switch starts conducting before the switch is turned on.

12. A power converter, comprising:
a bidirectional converter electrically coupled between a first power system and a second power system, the bidirectional converter comprising a number of phase legs; and
a control system for the bidirectional converter configured, during a portion of a line cycle of the first power system, to:
clamp a first phase leg of the bidirectional converter from switching; and
operate a second phase leg of the bidirectional converter in discontinuous conduction mode (DCM); and
operate a third phase leg of the bidirectional converter in triangular current mode (TCM).

13. The power converter of claim 12, wherein the control system is configured to control at least one of a switch in the second phase leg of the bidirectional converter and a switch in the third phase leg of the bidirectional converter.

14. The power converter of claim 13, wherein the control system is configured to control the switch in the third phase leg of the bidirectional converter when a current on the third phase leg of the bidirectional converter reaches a peak value.

15. The power converter of claim 13, wherein the control system is configured to control the switch in the third phase leg of the bidirectional converter after a current on the third phase leg of the bidirectional converter reaches a peak value.

16. The power converter of claim 13, wherein the control system is configured to:
at an end of a first time interval turn off the switch in the third phase leg of the bidirectional converter to allow resonance to occur between an output source capacitor of the switch in the third phase leg of the bidirectional converter and at least one inductor on the third phase leg of the bidirectional converter during a second time interval; and
at an end of the second time interval, turn on a second switch in the third phase leg of the bidirectional converter at zero voltage.

17. The power converter of claim 16, wherein the second switch in the third phase leg is a synchronous rectifier.

18. The power converter of claim 13, wherein the control system is configured to:
at an end of a first time interval, turn off the switch in the second phase leg of the bidirectional converter allowing, during a second time interval, a current on the third phase leg of the bidirectional converter to reach zero, a switch in the first phase leg of the bidirectional converter and a second switch in the third phase leg of the bidirectional converter to conduct, and a current on the first phase leg of the bidirectional converter and a current on the second phase leg of the bidirectional converter to reach zero during a second time interval; and
at an end of the second time interval, turn on a second switch in the second phase leg of the bidirectional converter at zero voltage allowing the current on the second phase leg of the bidirectional converter to discharge a capacitor across the switch in the third leg of the bidirectional converter and permit zero voltage turn on of the switch in the third leg of the bidirectional converter.

19. The power converter of claim 12, wherein the bidirectional converter is operated across at least one of: a range of power factors from −30° to 30° in inverter mode, and a range of power factors from −1 to 1 in inverter mode.

20. The power converter of claim 12, wherein the bidirectional converter is operated across at least one of: a range of power factors from −30° to 30° in rectifier mode, and a range of power factors from −1 to 1 in rectifier mode.

* * * * *